Jan. 9, 1968 C. M. SCURR ETAL 3,362,632
SALES REGISTER DEVICE

Filed May 9, 1967 3 Sheets-Sheet 1

INVENTORS
CHARLES M. SCURR
STANLEY R. RAY
BY
Drummond & Cahill
ATTORNEYS

INVENTORS.
CHARLES M. SCURR
STANLEY R. RAY
BY
Drummond & Cahill
ATTORNEYS

# United States Patent Office 3,362,632
Patented Jan. 9, 1968

3,362,632
SALES REGISTER DEVICE
Charles M. Scurr, Glendale, and Stanley R. Ray, Phoenix, Ariz., assignors to Gilbert Engineering Co. Inc., a corporation of Arizona
Filed May 9, 1967, Ser. No. 637,274
1 Claim. (Cl. 235—94)

ABSTRACT OF THE DISCLOSURE

A sales register device for use in indicating the sales volume of a liquid product dispenser. The register device has a plurality of key operated locks for selectively engaging an associated counter unit and simultaneously activating the liquid product dispenser.

Background of the invention

This invention relates to a sales register device.

More particularly, the invention concerns an improved sales register device of the general type disclosed in the U.S. Patent No. 3,026,032, for use in indicating the sales volume of a liquid product dispensed by a liquid vending machine.

In a further aspect, the invention relates to an improved sales register device of the type described above having a simplified design, more effective operation, and an extended service life.

Dispensing pumps, of the type employed by gasoline service stations, are commonplace. The conventional pump is provided with a switch to activate and deactivate the delivery means, a master register which displays the accumulated volume and value of each individual sales and a means for zeroing the register display. When making a sale the service station attendant first zeros the register to erase the prior sale, manipulates the switch to activate the pump delivery system and then dispenses the amount of product requested by the customer. After delivery the attendant collects monies from the customer in the amount displayed by the master register.

A counter device accumulates the total volume of liquid dispensed. However, each individual sale is erased prior to a subsequent sale. During a given period of time one attendant may dispense gasoline from several pumps and likewise several attendants may use the same pump. Periodically the accumulative counter is read and checked against the monies received. This auditing procedure attempts to balance the monies received by all attendants against the total product dispensed. If a discrepancy appears it is extremely difficult, if not impossible, to determine which attendant is inaccurate or careless in the exchange of monies for his sales.

Virtually every gasoline dispensing pump is of similar design and construction. The pump embodies a motor driving a fluid pump which delivers gasoline from the supply reservoir through the dispensing hose to the customers container. The motor is controlled by an electric switch associated with the hose nozzle hanger mechanism on the side of the pump housing; the switch is activated when the nozzle is removed and deactivated when the nozzle is replaced. A master register driven by the pump or a flowmeter provides a visual display of the volume and monetary value of each sale. An external handle functions to zero the master register subsequent to each sale. Accumulative counters, not readily visible to the customer, records the total sales volume of liquid dispensed.

The prior art discloses a sales register device to be attached atop the gasoline pump to indicate the individual sales volume of each of several attendants. Briefly, the device has an upright drive shaft having a plurality of coaxially counted bevel gears. A flexible drive line connects to the master register and rotates the shaft in timed relation thereto. A plurality of counter units, each driven by a pinion gear supported by the counter shaft, are selectively engageable with the upright shaft. The appropriate counter, recording the sales of an individual attendant, is engaged by a lock mechanism requiring the key issued to that attendant. Manipulation of the lock concurrently displaces a slide bar connected to an operating wire engaging the pump activation switch.

The mechanics of gasoline dispensing pumps are old and well known in the art. A detailed description of the mechanism and the operation thereof, and the specific interaction between the pump and the sales register device is explicitly detailed in U.S. Patent No. 3,026,032, supra.

The prior art sales register device is complex and contains a large number of parts, and is, therefore, of reduced reliability and requires an inordinate amount of maintenance.

Summary of the invention

Accordingly, it is a principal object of the present invention to provide an improved sales register device of simplified design and having a minimum number of operative components.

Another object of the invention, is the provision of a sales register device in which wear of the gear is reduced.

Another object of the invention is to provide an improved sales register device in which the gears engage easier and require less force to retain driving engagement.

Yet another object of the invention is the provision of an improved sales register device which is relatively inexpensive to manufacture, operationally dependable, and requiring inappreciable maintenance.

Yet still another object of the present invention is to provide a sales register device of the type described above which is readily interchangeable with existing prior art sales registers and easily attached in new installations.

Briefly, in order to accomplish the desired objectives of my present invention I provide a driven shaft having a series of bevel gears mounted coaxially along the shaft. The driven shaft is rotatable in response to the rotation of the flowmeter or master register. A series of counter units, one associated with each bevel gear, is selectively engageable with the driven shaft.

Each counter unit comprises a revolution counter having an input shaft and a driving pinion gear affixed thereto. The counter unit is slidable along the axis of rotation of the pinion gear to move the pinion gear from a disengaged position out of driving contact with the bevel gear to an engaged position in driving contact with the bevel gear.

Each counter unit is selectively engaged with the drive shaft by an individual key operated lock. The key lock also activates a slide communicating with the pump switch.

Brief description of the drawings

The desirability of the improvements and further and more specific objects and advantages of the invention will become apparent to those skilled in the art from the following detailed description of the invention taken in conjunction with the drawings in which.

*Description of the preferred embodiment*

Figure 1:
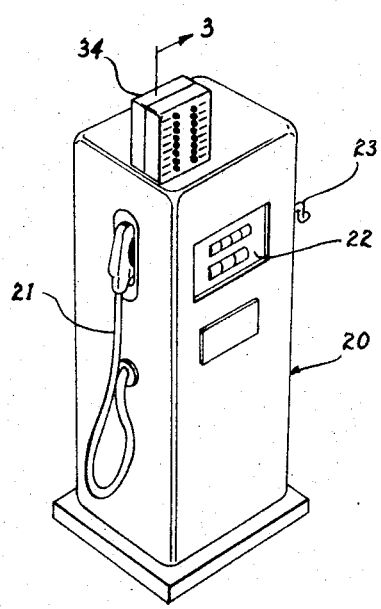
FIG. 1 is a perspective view of the improved sales register device, embodying the present invention, as it would appear when attached to a conventional gasoline dispensing pump.

Turning now to the drawings in which the same reference numerals indicate corresponding elements throughout the several views, FIG. 1 illustrates a conventional gasoline dispensing pump generally designated by the reference character 20. A hose 21 extends from the pump 20 to deliver gasoline to the customers container. A master register 22 provides a visual display of the volume and monetary value of the sale. A handle 23 operatively engages the master register 22 for zeroing the same subsequent to each sale. A sales register device 24, constructed in accordance with the teachings of the present invention, is mounted upon the pump 20.

Figure 3:
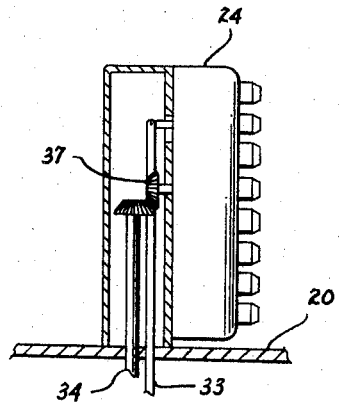
FIG. 3 is a schematic view, taken along line 3—3 of FIG. 1, illustrating the operative connection between the improved sales register device and the gasoline dispensing pump.
Figure 2:
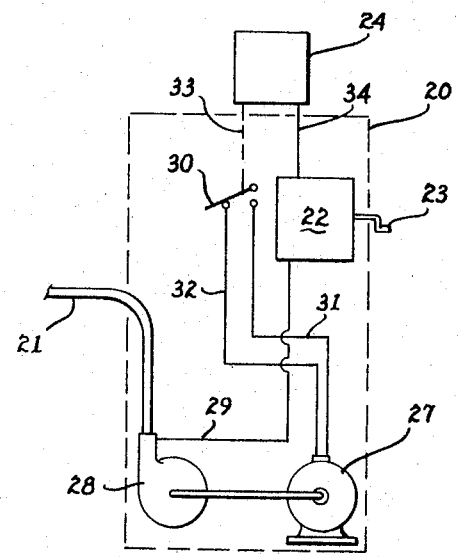
FIG. 2 is a schematic illustration of the mechanism of a gasoline pump and the interaction of the improved sales register device.

FIGS. 2 and 3 schematically illustrate the operative components of the gasoline pump 20 and the interaction of the sales register device 24 therewith. An electric motor 27 drives a pump 28 which displaces gasoline from the customary reservoir tank and discharges it through the hose 21. A communication line 29 driven by the pump 28 drives the visual display dials of the master register 22. A switch 30 opens and closes the circuit between the line 31 and 32 to control the motor 27.

A connecting rod 33 moved by the sales register device activation means operate the switch 30. A drive line 34 connected to and rotated in response to the master register 22 communicates with the sales register input shaft 37. The interaction between the sales register device 24 and the gasoline dispensing pump 20 here above briefly described is disclosed in U.S. Patent No. 3,026,032. The improved sales register device 24 will be hereinafter described in detail.

Figure 5:
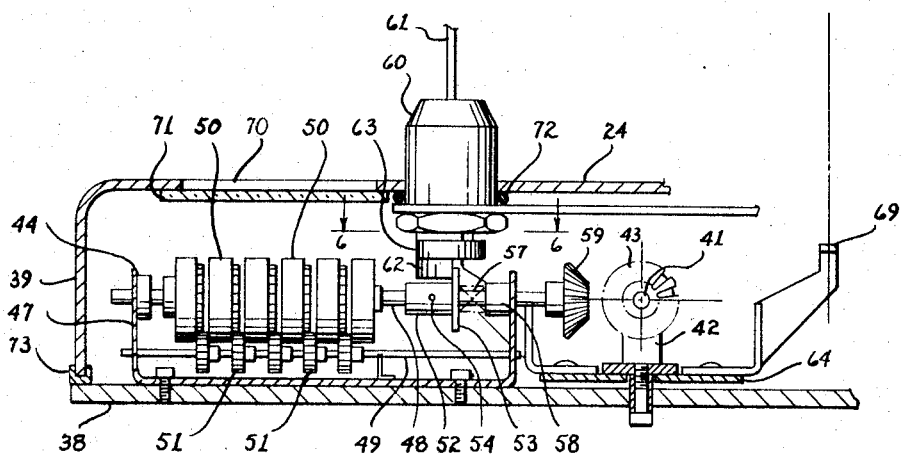
FIG. 5 is a partial sectional view taken along line 5—5 of FIG. 4, further detailing the operative elements illustrated in FIG. 4.
Figure 4:
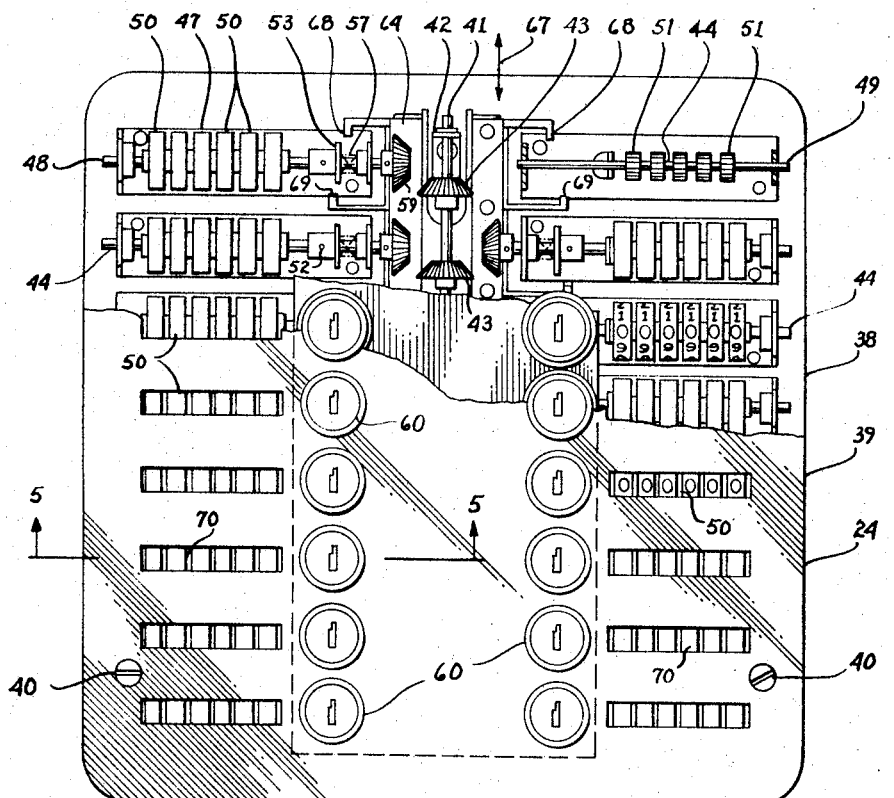
FIG. 4 is a front elevational view of the improved sales register device of the present invention partially broken to show the internal operative elements.

FIGS. 4 and 5 specifically detail the operative elements of the device of the present invention. The housing for the improved sales register device 24 consists of a backplate 38 and a box-like cover member 39 detachably secured with machine screws 40. A driven shaft 41 is rotatably supported by brackets 42 secured to the backplate 38. A plurality of bevel gears 43 are coaxially mounted on the driven shaft 41. A plurality of revolution counters 44 are arranged in two rows, one on either side of the central driven shaft 41.

Each revolution counter 44 consists of a body 47 supporting a primary counter shaft 48 and a secondary shaft 49. Dials 50 are coaxially carried by the primary shaft 48 and dial pinions 51 are carried by the secondary shaft 49 to accumulate totals corresponding to the rotation of the shaft 48 in accordance with conventional revolution counter art. The primary shaft 48 is slidably and rotatably journaled within the body 47. The secondary shaft 49 is secured to the body 47 while the dial pinions 51 are rotatably and slidably journaled thereupon. A collar 52 having a flange 53 is coaxially secured to the shaft 48, preferably by means of a tension pin 54 a compression spring 57 encircles the shaft 48 between the flange 53 and the forward shaft bearing 58. A pinion 59, suitable to mate with the bevel gear 43 is secured to the end of the shaft 48. It is herein noted that the counters 44 are secured to the backplate 38 at right angles to the driven shaft 41 and that the counter shaft 48 is slidable within the housing 44 to engage the pinion gear 59 into driving engagement with the associated bevel gear 43.

A lock 60 operated by a key 61 is associated with each counter unit 44. A lower cam 62 and an upper cam 63 is rotatable by each lock 60. A slide 64, movable in the direction of the double headed arrow 67, is suitably mounted to the backplate 38. Relative each counter 44, the slide 64 carries an interlock consisting of a detent 68 and a cam follower 69.

Openings 70 in the face of the cover 39 provide visual access to the dials 50 of each of the several revolution counters 44. A transparent sheet 71, either glass or Plexiglas, seals the opening 70. An O-ring 72 encircling the lock 60 and a gasket 73 between the backplate 38 and the cover 39 seals the device against the elements.

Figure 6:
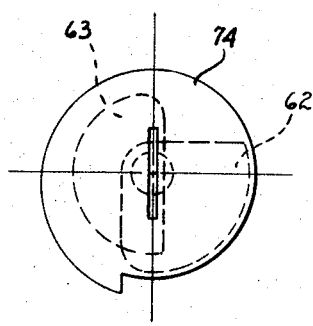
FIG. 6 is a partial section taken along line 6—6 of FIG. 5, showing the actuator cam.

FIG. 6 details the configuration and arrangement of the cams 62 and 63. The lock backplate 74 is included here for reference to the cams.

Figure 7:
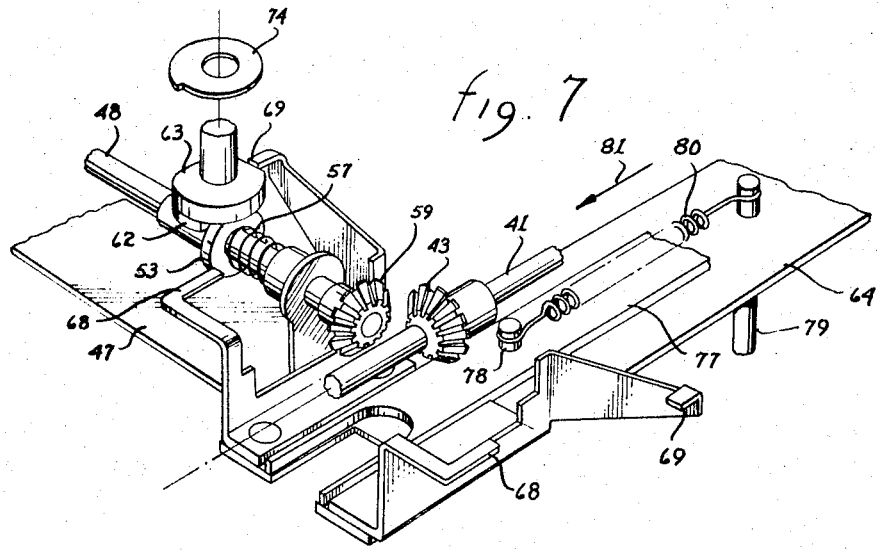
FIG. 7 is a fragmentary perspective view particularly detailing the engaging and activating elements associated with one counter at the deactivated position.
Figure 8:
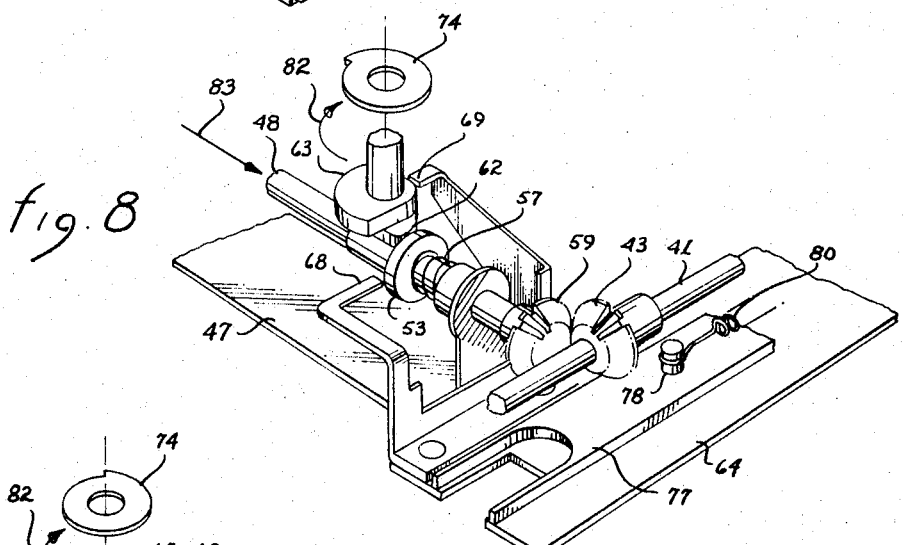
FIG. 8 is a view corresponding to FIG. 7 illustrating the elements thereof during an intermediate phase of the engagement and activation cycle.
Figure 9:
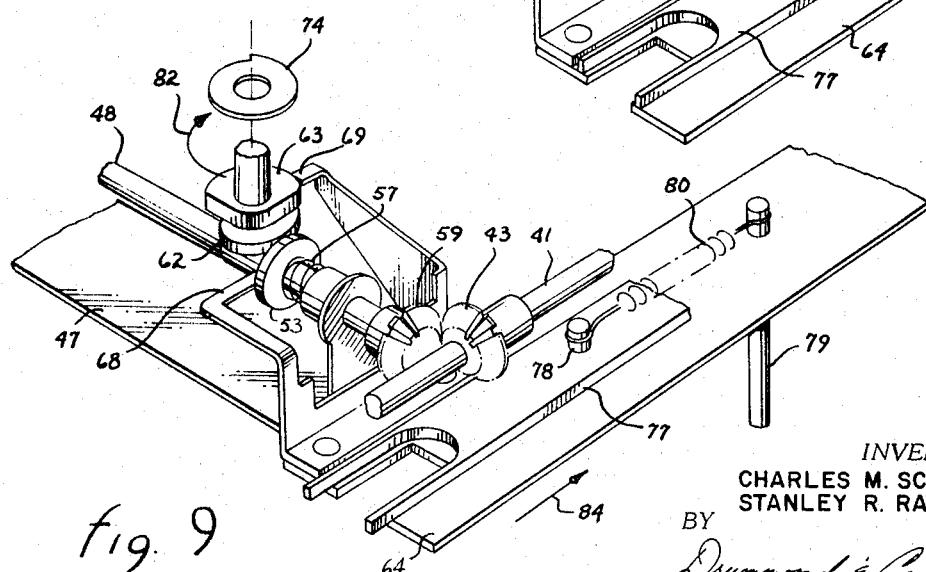
FIG. 9 is a view corresponding to FIG. 7 illustrating the elements thereof during the fully engaged and activated position.

FIGS. 7–9 specifically illustrate the sequential operation of the elements of the improved register device of the present invention. Referring specifically to FIG. 7 the device is shown in the non-engaged position. A plate 77 secured to the backplate 38 carries a spring anchor 78. A pin 79 extending through the slide 64 is united with the connecting rod 33 for operation as here above described. The internal end of the pin 79 forms a spring anchor for the tension spring 80 which pulls against the spring anchor 78 and normally urges the slide in the direction of the arrow 81. During initial rotation of the lock as illustrated by rotation of the lockplate 74 in the direction of the arrow 82 in FIG. 8, the lower cam 62 abuts the flange 53 and urges the shaft 48 in the direction of the arrow 83. The pinion 59 is thus engaged in driving contact with the bevel gear 43. During this cycle the spring 57 is compressed. After the point of engagement between the pinion 59 and the bevel gear 43, the cam 62 assumes a constant diameter and exerts no further camming force upon the flange 53. Further rotation of the lock in the direction of the arrow 82, to the terminal position as illustrated by the lockplate 74 in FIG. 9, brings the upper cam 63 to bear against the interlock cam follower 69. The second cam action pushes the slide 64 in the direction of the arrow 84. As the slide moves it carries the pin 79 to displace the connecting rod 33 and close the switch 30 as here above illustrated in FIGS. 2–3. The tension spring 80 is now extended. Simultaneously, the detent 68 engages behind the flange 53 to insure engagement between the pinion 59 and the bevel gear 43.

It will be immediately apparent that each individual counter unit is engaged correspondingly by its associated lock. When the lock is reversed the cam 63 releases the cam follower 69 allowing the tension spring 80 to relax and return the slide 64 to the rest position thereby disengaging the detent 68 and opening the switch 30. Before the key can be removed from the lock it must be counter rotated to the initial position as illustrated in FIG. 7 wherein the cam 62 is retracted from the flange 53 permitting the spring 57 to expand, pushing the shaft 48 in a direction opposite the arrow 83 to disengage the pinion 59 from the bevel gear 43.

Various changes in the device herein chosen for purposes of illustration in the drawings will readily occur to persons skilled in the art having regard for the disclosure hereof. To the extent that such modifications and variations do not depart from the spirit of the invention they are intended to be included within the scope thereof which is not limited to the device specifically illustrated in the drawings but rather only by a fair interpretation of the following claims.

Having fully described the invention in such manner as to enable those skilled in the art to understand and practice the same, we claim:

1. A sales register device for use in indicating the sales volume of a liquid product, which product is dispensed by a pump assembly including:
   a product liquid pump,
   means for delivering the product liquid from the pump to the receiving container,
   a flowmeter for measuring the volume of product liquid delivered to said container,
   switch means to activate and deactivate said pump,
   said sales register device comprising:
   (a) a driven shaft rotatable in response to rotation of said flowmeter output shaft;
   (b) a plurality of counter units selectively engageable with said driven shaft, each said unit comprising;
      (i) a revolution counter having an input shaft,
      (ii) a drive train for transmitting rotational motion of said driven shaft to said revolution counter comprising:
         a bevel gear mounted coaxially on said driven shaft,
         a pinion gear mounted on said input shaft movable along its own rotational axis from a disengaged position out of driving contact with said bevel gear to an engaged position in driving contact with said bevel gear,
   (c) actuator means for selectively engaging one of said counter units with said driven shaft and for closing said pump switch means when said selected counter unit is engaged, said actuator means including:
      (1) spring means acting perpendicularly to said driven shaft for normally urging said pinion apart from said bevel gear,
      (2) a first cam means to overcome said spring means and move said pinion gear into driving contact with said bevel gear, and
      (3) a detent to retain said pinion gear during driving contact with said bevel gear.

References Cited
UNITED STATES PATENTS

| | | | |
|---|---|---|---|
| 2,024,492 | 12/1935 | Wallace | 235—94 |
| 2,103,650 | 12/1937 | Spaunburg | 235—91 |
| 2,522,845 | 9/1950 | Stevens | 235—91 |
| 2,838,237 | 6/1958 | Spaunburg et al. | 235—94 |
| 3,026,032 | 3/1962 | Settlemire | 235—94 |
| 3,306,536 | 2/1967 | Wilson | 235—91 |

RICHARD B. WILKINSON, *Primary Examiner.*

STANLEY A. WAL, *Assistant Examiner.*